US012045638B1

(12) United States Patent
Gu et al.

(10) Patent No.: US 12,045,638 B1
(45) Date of Patent: Jul. 23, 2024

(54) ASSISTANT WITH ARTIFICIAL INTELLIGENCE

(71) Applicant: BitHuman Inc

(72) Inventors: Steve Gu, Lafayette, CA (US); Yun Fu, Newton, MA (US)

(*) Notice: Subject to any disclaimer, the term of this patent is extended or adjusted under 35 U.S.C. 154(b) by 0 days.

(21) Appl. No.: 18/212,180

(22) Filed: Jun. 21, 2023

(51) Int. Cl.
*G06F 9/451* (2018.01)

(52) U.S. Cl.
CPC .................................. *G06F 9/453* (2018.02)

(58) Field of Classification Search
CPC ........ G06F 9/453; G06F 3/012; G06T 19/006
See application file for complete search history.

(56) References Cited

U.S. PATENT DOCUMENTS

| 2013/0266925 | A1* | 10/2013 | Nunamaker, Jr. ........ G09B 7/00 434/362 |
| 2018/0308473 | A1* | 10/2018 | Scholar ................... A63F 13/00 |
| 2020/0012916 | A1* | 1/2020 | Dolignon ............... G06N 3/006 |

OTHER PUBLICATIONS

Clement Delgrange et al., Usage-Based Learning in Human Interaction With an Adaptive Virtual Assistant, Jul. 8, 2019, IEEE Transactions on Cognitive and Developmental Systems, vol. 12, No. 1, pp. 109-123 (Year: 2019).*
Bhawana Sati et al., An Intelligent Virtual System using Machine Learning, May 20, 2022, IEEE IAS Global Conference on Emerging Technologies, pp. 1-7 (Year: 2022).*

* cited by examiner

*Primary Examiner* — Tam T Tran

(57) ABSTRACT

Embodiments of the present disclosure may include a method for providing an encounter via a virtual assistant with artificial intelligence, the method including detecting, by one or more processors, an encounter request from a user.

9 Claims, 9 Drawing Sheets

ASSISTANT WITH ARTIFICIAL INTELLIGENCE

BACKGROUND OF THE INVENTION

Embodiments of the present disclosure may include a method for providing an encounter via a virtual assistant with artificial intelligence (AI) and thus provide many other novel and useful features.

BRIEF SUMMARY

Embodiments of the present disclosure may include a method for providing an encounter via a virtual assistant with artificial intelligence, the method including detecting, by one or more processors, an encounter request from a user. In some embodiments, an artificial intelligence engine may be coupled to the one or more processors. In some embodiments, the artificial intelligence engine may be trained by human experts in the field.

In some embodiments, the virtual assistant may be configured to be displayed in LED/OLED displays, Android/iOS tablets, Laptops/PCs, or VR/AR goggles. In some embodiments, a set of multi-layer info panels coupled to the one or more processors may be configured to overlay graphics on top of the virtual assistant. In some embodiments, the virtual assistant may be configured to be displayed as a human avatar or a cartoon character based on the user's choice.

In some embodiments, the virtual assistant may be configured to be displayed in full body or half body portrait mode. In some embodiments, the artificial intelligence engine may be configured for real-time speech recognition, speech to text generation, real-time dialog generation, text to speech generation, voice-driven animation, and human avatar generation.

In some embodiments, the artificial intelligence engine may be configured to emulate different voices and use different languages. In some embodiments, the human avatar may be configured to behave like a real human. In some embodiments, the human avatar may be configured to look like a real human. In some embodiments, the human avatar may be configured to have a unique personality out of a set of personalities.

In some embodiments, the human avatar may be configured to have a unique emotion setup of a set of emotion setups. In some embodiments, the human avatar may be configured to have a unique intelligence out of a set of intelligences. In some embodiments, the human avatar may be configured to share ideas and information and guide the user depending the user's needs.

In some embodiments, the human avatar may be configured to help the user to achieve the user's goals. In some embodiments, the human avatar may be configured to be generated in a human-sized glass, or tablet, or a wall-mounted tablet that can move and be adjusted by the user. In some embodiments, the human avatar may be configured to interact with the user via microphones, loud speaker, touch screen, front facing camera, wifi and bluetooth modules, adjustable holder &.

Embodiments may also include wheels that may be coupled to the one or more processors. Embodiments may also include detecting, by the one or more processors and a set of sensors coupled to the one or more processors, an entering of the user into an encounter area. In some embodiments, the set of sensors monitor the encounter area in a pre-determined manner.

Embodiments may also include detecting and tracking the user's face, eye, and pose by a set of outward-facing cameras coupled to the one or more processors. In some embodiments, a set of touch screens coupled to the one or more processors may be configured to allow the user to interact with the virtual assistant by hand. Embodiments may also include detecting the user's voice by a set of microphones coupled to the one or more processors.

In some embodiments, the set of microphones may be connected to loudspeakers. In some embodiments, the set of microphones may be enabled to be beamforming. Embodiments may also include selecting a goal model from a set of goal models that each reflects a different type of assistance to be provided to the user by the virtual assistant.

In some embodiments, the selection of the goal model may be based on the actions of the user performed after the user enters into the encounter area and analysis of the artificial intelligence engine. In some embodiments, the set of goal models may be generated from the artificial intelligence with a number of human experts with non-public expertise.

In some embodiments, non-public expertise may include knowledge, human interaction, human characters, human conversation and human physiology. Embodiments may also include selecting, by the one or more processors and the artificial intelligence engine, based on the goal model and responsive to the encounter request, a first encounter including a first representation and a first dialog output.

Embodiments may also include providing, by the one or more processors and the artificial intelligence engine, based on the goal model and responsive to the encounter request, the first encounter for presentation to the user on the virtual assistant. Embodiments may also include receiving, by the one or more processors and from the user, a first user reaction, the first user reaction including a first user dialog input and a first user engagement input.

Embodiments may also include selecting, based on the first user reaction and using the goal model, a second encounter including a second representation and a second dialog output. Embodiments may also include providing, the second encounter for presentation to the user on the virtual assistant. Embodiments may also include determining, from the first user reaction, conversational metrics for the enhanced encounter. Embodiments may also include adjusting the conversational goal in response to the conversational metrics. In some embodiments, the artificial intelligence engine may be a generative artificial intelligence engine.

Embodiments of the present disclosure may also include a method for providing an encounter via a virtual assistant with artificial intelligence, the method including detecting, by one or more processors, an encounter request from a user. In some embodiments, an artificial intelligence engine may be coupled to the one or more processors. In some embodiments, the artificial intelligence engine may be trained by human experts in the field.

In some embodiments, the virtual assistant may be configured to be displayed in LED/OLED displays, Android/iOS tablets, Laptops/PCs, or VR/AR goggles. In some embodiments, a set of multi-layer info panels coupled to the one or more processors may be configured to overlay graphics on top of the virtual assistant. In some embodiments, the virtual assistant may be configured to be displayed as a human avatar or a cartoon character based on the user's choice.

In some embodiments, the virtual assistant may be configured to be displayed in full body or half body portrait mode. In some embodiments, the artificial intelligence engine may be configured for real-time speech recognition, speech to text generation, real-time dialog generation, text to speech generation, voice-driven animation, and human avatar generation.

In some embodiments, the artificial intelligence engine may be configured to emulate different voices and use different languages. In some embodiments, the human avatar may be configured to behave like a real human. In some embodiments, the human avatar may be configured to look like a real human. In some embodiments, the human avatar may be configured to have a unique personality out of a set of personalities.

In some embodiments, the human avatar may be configured to have a unique emotion setup of a set of emotion setups. In some embodiments, the human avatar may be configured to have a unique intelligence out of a set of intelligences. In some embodiments, the human avatar may be configured to share ideas and information and guide the user depending the user's needs.

In some embodiments, the human avatar may be configured to help the user to achieve the user's goals. In some embodiments, the human avatar may be configured to be generated in a human-sized glass, or tablet, or a wall-mounted tablet that can move and be adjusted by the user. In some embodiments, the human avatar may be configured to interact with the user via microphones, loud speaker, touch screen, front facing camera, wifi and bluetooth modules, adjustable holder &.

Embodiments may also include wheels that may be coupled to the one or more processors. Embodiments may also include detecting, by the one or more processors and a set of sensors coupled to the one or more processors, an entering of the user into an encounter area. In some embodiments, the set of sensors monitor the encounter area in a pre-determined manner.

Embodiments may also include detecting and tracking the user's face, eye, and pose by a set of outward-facing cameras coupled to the one or more processors. In some embodiments, a set of touch screens coupled to the one or more processors may be configured to allow the user to interact with the virtual assistant by hand. Embodiments may also include detecting the user's voice by a set of microphones coupled to the one or more processors.

In some embodiments, the set of microphones may be connected to loudspeakers. In some embodiments, the set of microphones may be enabled to be beamforming. Embodiments may also include selecting a goal model from a set of goal models that each reflects a different type of assistance to be provided to the user by the virtual assistant.

In some embodiments, the selection of the goal model may be based on the actions of the user performed after the user enters into the encounter area and analysis of the artificial intelligence engine. In some embodiments, the set of goal models may be generated from the artificial intelligence with a number of human experts with non-public expertise.

In some embodiments, non-public expertise may include knowledge, human interaction, human characters, human conversation and human physiology. Embodiments may also include selecting, by the one or more processors and the artificial intelligence engine, based on the goal model and responsive to the encounter request, a first encounter including a first representation and a first dialog output.

Embodiments may also include providing, by the one or more processors and the artificial intelligence engine, based on the goal model and responsive to the encounter request, the first encounter for presentation to the user on the virtual assistant. Embodiments may also include receiving, by the one or more processors and from the user, a first user reaction, the first user reaction including a first user dialog input and a first user engagement input.

Embodiments may also include selecting, based on the first user reaction and using the goal model, a second encounter including a second representation and a second dialog output. Embodiments may also include providing, the second encounter for presentation to the user on the virtual assistant. Embodiments may also include determining, from the first user reaction, conversational metrics for the enhanced encounter. Embodiments may also include adjusting the conversational goal in response to the conversational metrics. Embodiments may also include providing, the third encounter for presentation based on the conversational metrics to the user on the virtual assistant. In some embodiments, the artificial intelligence engine may be a generative artificial intelligence engine.

Embodiments of the present disclosure may also include a method for providing an encounter via a virtual assistant with artificial intelligence, the method including detecting, by one or more processors, an encounter request from a user. In some embodiments, an artificial intelligence engine may be coupled to the one or more processors. In some embodiments, the artificial intelligence engine may be trained by human experts in the field.

In some embodiments, the virtual assistant may be configured to be displayed in LED/OLED displays, Android/iOS tablets, Laptops/PCs, or VR/AR goggles. In some embodiments, a set of multi-layer info panels coupled to the one or more processors may be configured to overlay graphics on top of the virtual assistant. In some embodiments, the virtual assistant may be configured to be displayed as a human avatar or a cartoon character based on the user's choice.

In some embodiments, the virtual assistant may be configured to be displayed in full body or half body portrait mode. In some embodiments, the artificial intelligence engine may be configured for real-time speech recognition, speech to text generation, real-time dialog generation, text to speech generation, voice-driven animation, and human avatar generation.

In some embodiments, the artificial intelligence engine may be configured to emulate different voices and use different languages. In some embodiments, the human avatar may be configured to behave like a real human. Embodiments may also include detecting, by the one or more processors and a set of sensors coupled to the one or more processors, an entering of the user into an encounter area.

In some embodiments, the set of sensors monitor the encounter area in a pre-determined manner. Embodiments may also include detecting and tracking the user's face, eye, and pose by a set of outward-facing cameras coupled to the one or more processors. In some embodiments, a set of touch screens coupled to the one or more processors may be configured to allow the user to interact with the virtual assistant by hand.

Embodiments may also include detecting the user's voice by a set of microphones coupled to the one or more processors. In some embodiments, the set of microphones may be connected to loudspeakers. In some embodiments, the set of microphones may be enabled to be beamforming. Embodiments may also include selecting a goal model from a set of goal models that each reflects a different type of assistance to be provided to the user by the virtual assistant.

In some embodiments, the selection of the goal model may be based on the actions of the user performed after the user enters into the encounter area and analysis of the artificial intelligence engine. In some embodiments, the set of goal models may be generated from the artificial intelligence with a number of human experts with non-public expertise.

In some embodiments, non-public expertise may include knowledge, human interaction, human characters, human conversation and human physiology. Embodiments may also include selecting, by the one or more processors and the artificial intelligence engine, based on the goal model and responsive to the encounter request, a first encounter including a first representation and a first dialog output.

Embodiments may also include providing, by the one or more processors and the artificial intelligence engine, based on the goal model and responsive to the encounter request, the first encounter for presentation to the user on the virtual assistant. Embodiments may also include receiving, by the one or more processors and from the user, a first user reaction, the first user reaction including a first user dialog input and a first user engagement input.

Embodiments may also include selecting, based on the first user reaction and using the goal model, a second encounter including a second representation and a second dialog output. Embodiments may also include providing, the second encounter for presentation to the user on the virtual assistant. Embodiments may also include determining, from the first user reaction, conversational metrics for the enhanced encounter. Embodiments may also include adjusting the conversational goal in response to the conversational metrics. Embodiments may also include providing, the third encounter for presentation based on the conversational metrics to the user on the virtual assistant. In some embodiments, the artificial intelligence engine may be a generative artificial intelligence engine.

DETAILED DESCRIPTION

Figure 1A:
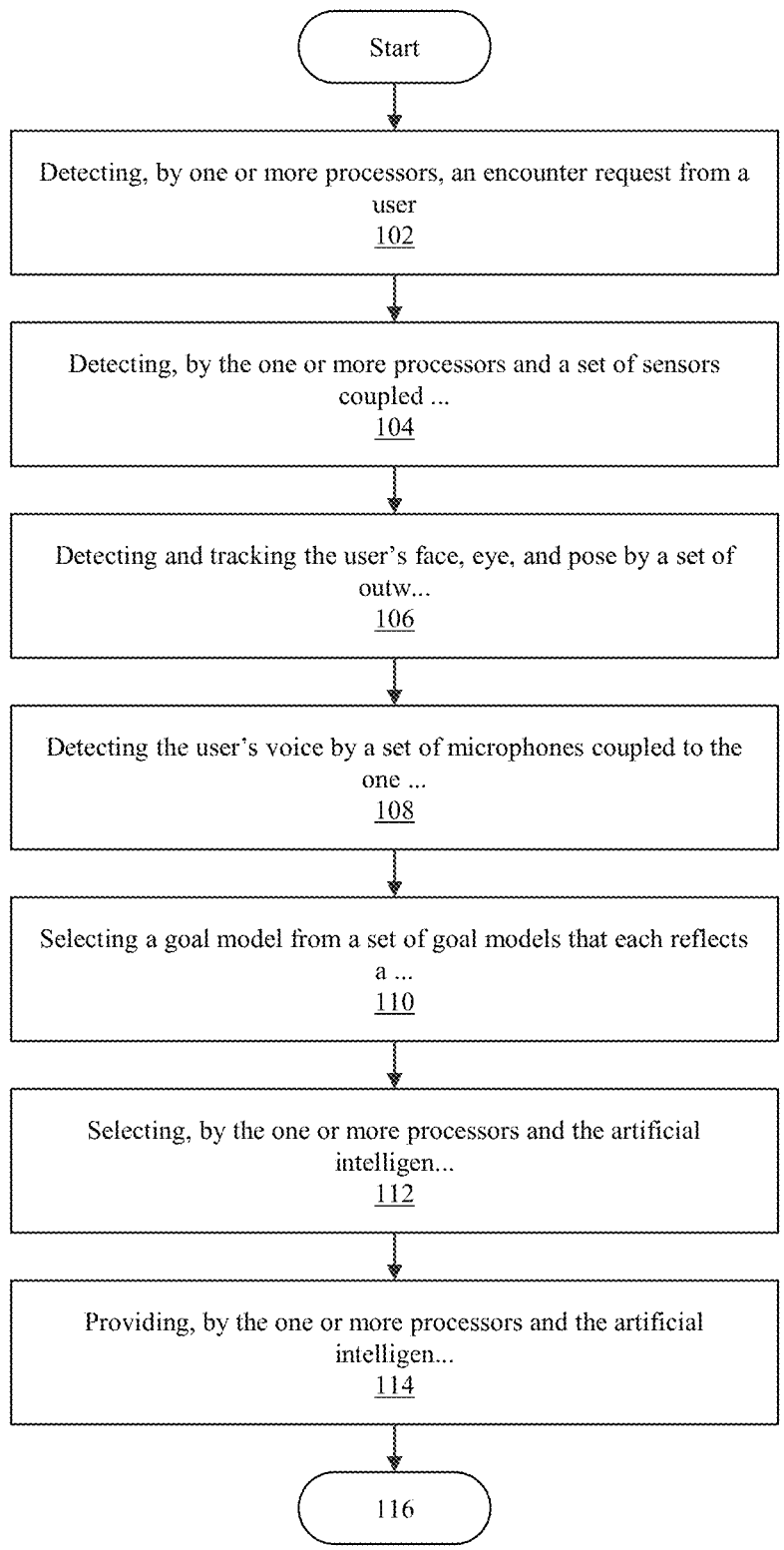
FIG. 1A is a flowchart illustrating a method for providing an encounter, according to some embodiments of the present disclosure.
Figure 1B:
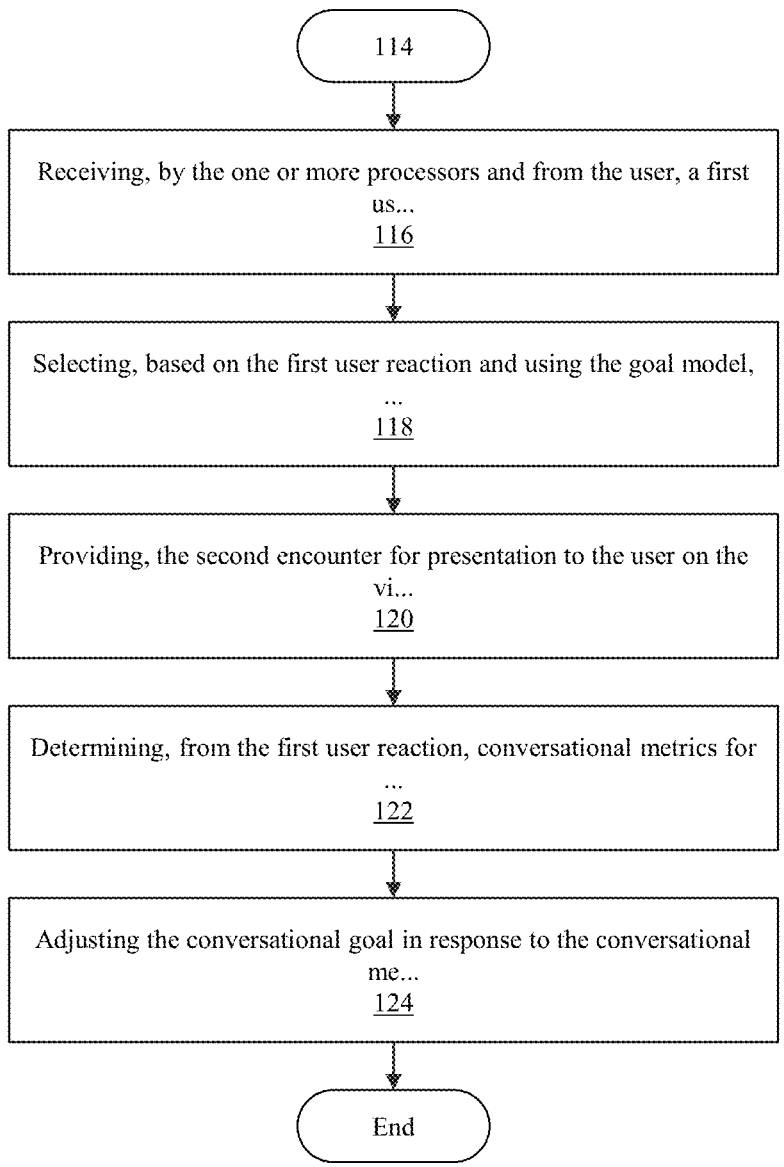
FIG. 1B is a flowchart extending from FIG. 1A and further illustrating the method for providing an encounter, according to some embodiments of the present disclosure.

FIGS. 1A to 1B are flowcharts that describe a method for providing an encounter, according to some embodiments of the present disclosure. In some embodiments, at 102, the method may include detecting, by one or more processors, an encounter request from a user. At 104, the method may include detecting, by the one or more processors and a set of sensors coupled to the one or more processors, an entering of the user into an encounter area. At 106, the method may include detecting and tracking the user's face, eye, and pose by a set of outward-facing cameras coupled to the one or more processors.

In some embodiments, at 108, the method may include detecting the user's voice by a set of microphones coupled to the one or more processors. At 110, the method may include selecting a goal model from a set of goal models that each reflects a different type of assistance to be provided to the user by the virtual assistant. At 112, the method may include selecting, by the one or more processors and the artificial intelligence engine, based on the goal model and responsive to the encounter request, a first encounter including a first representation and a first dialog output.

In some embodiments, at 114, the method may include providing, by the one or more processors and the artificial intelligence engine, based on the goal model and responsive to the encounter request, the first encounter for presentation to the user on the virtual assistant. At 116, the method may include receiving, by the one or more processors and from the user, a first user reaction, the first user reaction including a first user dialog input and a first user engagement input.

In some embodiments, at 118, the method may include selecting, based on the first user reaction and using the goal model, a second encounter including a second representation and a second dialog output. At 120, the method may include providing, the second encounter for presentation to the user on the virtual assistant. At 122, the method may include determining, from the first user reaction, conversational metrics for the enhanced encounter. At 124, the method may include adjusting the conversational goal in response to the conversational metrics.

In some embodiments, an artificial intelligence engine may be coupled to the one or more processors. The artificial intelligence engine may be trained by human experts in the field. The virtual assistant may be configured to be displayed in LED/OLED displays, Android/iOS tablets, Laptops/PCs, or VR/AR goggles. A set of multi-layer info panels coupled to the one or more processors may be configured to overlay graphics on top of the virtual assistant.

In some embodiments, the virtual assistant may be configured to be displayed as a human avatar or a cartoon character based on the user's choice. The virtual assistant may be configured to be displayed in full body or half body portrait mode. The artificial intelligence engine may be configured for real-time speech recognition, speech to text generation, real-time dialog generation, text to speech generation, voice-driven animation, and human avatar generation.

In some embodiments, the artificial intelligence engine may be configured to emulate different voices and use different languages. The human avatar may be configured to behave like a real human. The human avatar may be configured to look like a real human. The human avatar may be configured to have a unique personality out of a set of personalities. The human avatar may be configured to have a unique emotion setup of a set of emotion setups.

In some embodiments, the human avatar may be configured to have a unique intelligence out of a set of intelligences. The human avatar may be configured to share ideas and information and guide the user depending the user's needs. The human avatar may be configured to help the user to achieve the user's goals. The human avatar may be configured to be generated in a human-sized glass, or tablet, or a wall-mounted tablet that can move and be adjusted by the user.

In some embodiments, the human avatar may be configured to interact with the user via microphones, loud speaker, touch screen, front facing camera, wifi and bluetooth modules, adjustable holder &. Wheels that may be coupled to the one or more processors. The set of sensors may monitor the encounter area in a pre-determined manner. A set of touch screens coupled to the one or more processors may be configured to allow the user to interact with the virtual assistant by hand.

In some embodiments, the set of microphones may be connected to loudspeakers. The set of microphones may be enabled to be beamforming. The selection of the goal model may be based on the actions of the user performed after the user may enter into the encounter area and analysis of the artificial intelligence engine. The set of goal models may be generated from the artificial intelligence with a number of human experts with non-public expertise. Non-public expertise may comprise knowledge, human interaction, human characters, human conversation and human physiology. In some embodiments, the artificial intelligence engine may be a generative artificial intelligence engine.

Figure 2A:
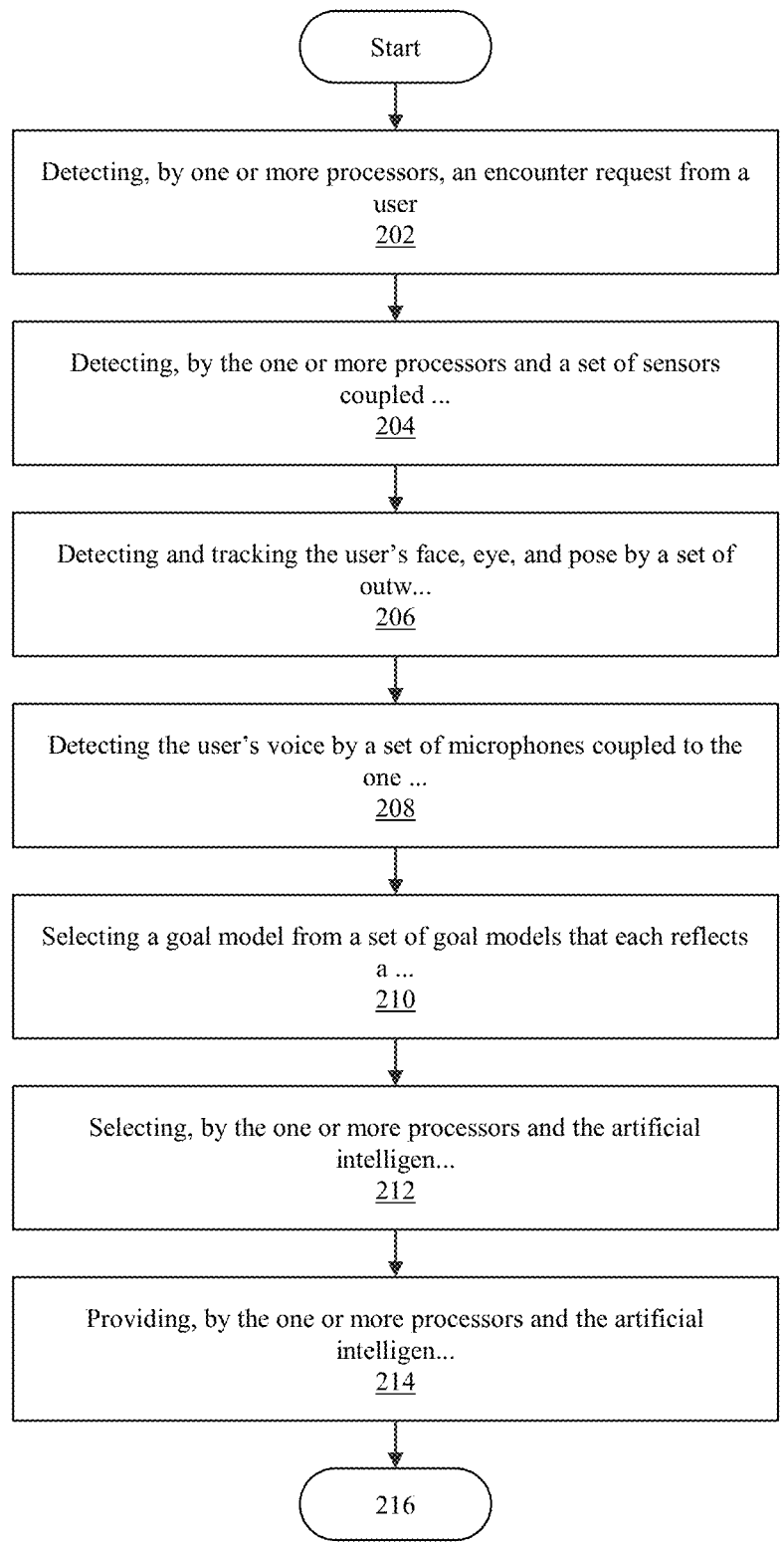
FIG. 2A is a flowchart illustrating a method for providing an encounter, according to some embodiments of the present disclosure.
Figure 2B:
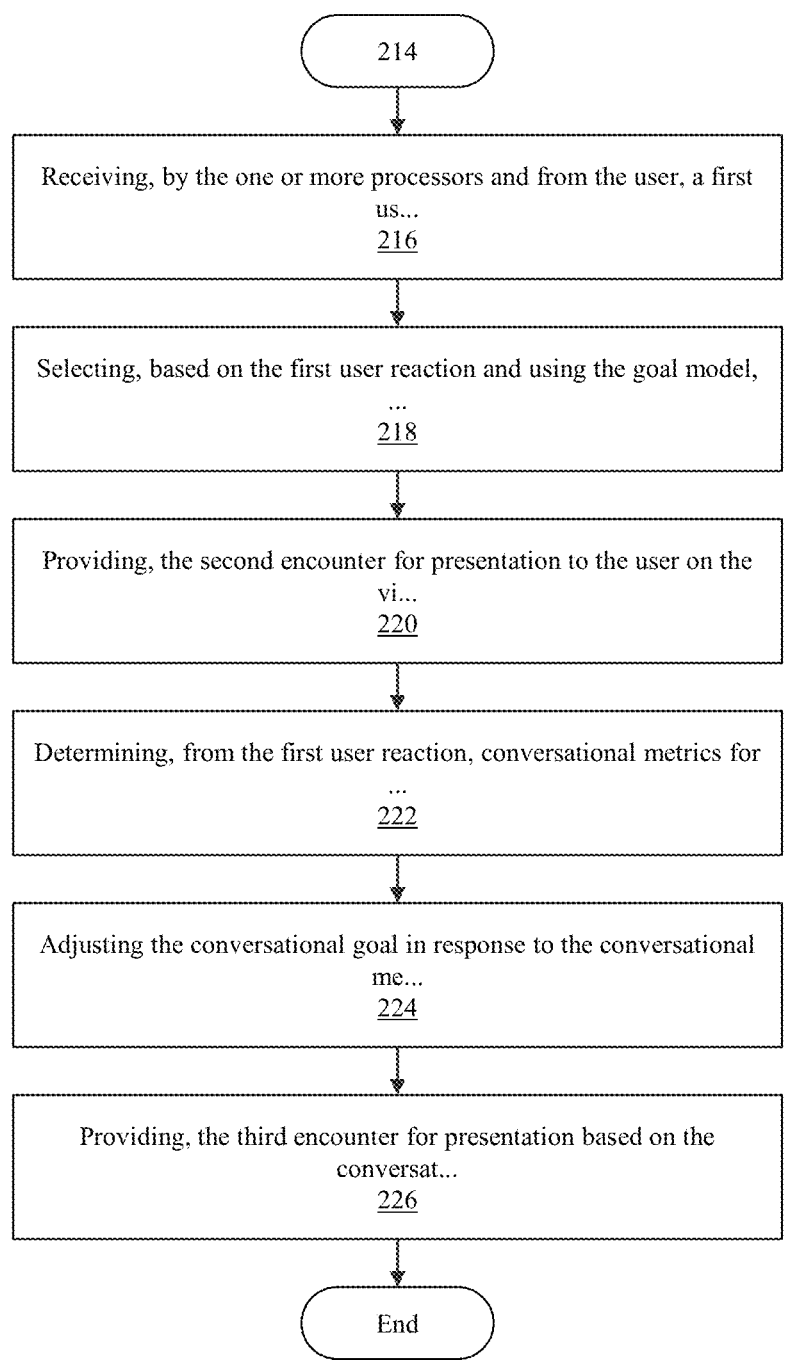
FIG. 2B is a flowchart extending from FIG. 2A and further illustrating the method for providing an encounter, according to some embodiments of the present disclosure.

FIGS. 2A to 2B are flowcharts that describe a method for providing an encounter, according to some embodiments of the present disclosure. In some embodiments, at 202, the method may include detecting, by one or more processors, an encounter request from a user. At 204, the method may include detecting, by the one or more processors and a set of sensors coupled to the one or more processors, an entering of the user into an encounter area. At 206, the method may include detecting and tracking the user's face, eye, and pose by a set of outward-facing cameras coupled to the one or more processors.

In some embodiments, at 208, the method may include detecting the user's voice by a set of microphones coupled to the one or more processors. At 210, the method may include selecting a goal model from a set of goal models that each reflects a different type of assistance to be provided to the user by the virtual assistant. At 212, the method may include selecting, by the one or more processors and the artificial intelligence engine, based on the goal model and responsive to the encounter request, a first encounter including a first representation and a first dialog output.

In some embodiments, at 214, the method may include providing, by the one or more processors and the artificial intelligence engine, based on the goal model and responsive to the encounter request, the first encounter for presentation to the user on the virtual assistant. At 216, the method may include receiving, by the one or more processors and from the user, a first user reaction, the first user reaction including a first user dialog input and a first user engagement input.

In some embodiments, at 218, the method may include selecting, based on the first user reaction and using the goal model, a second encounter including a second representation and a second dialog output. At 220, the method may include providing, the second encounter for presentation to the user on the virtual assistant. At 222, the method may include determining, from the first user reaction, conversational metrics for the enhanced encounter. At 224, the method may include adjusting the conversational goal in response to the conversational metrics. At 226, the method may include providing, the third encounter for presentation based on the conversational metrics to the user on the virtual assistant.

In some embodiments, an artificial intelligence engine may be coupled to the one or more processors. The artificial intelligence engine may be trained by human experts in the field. The virtual assistant may be configured to be displayed in LED/OLED displays, Android/iOS tablets, Laptops/PCs, or VR/AR goggles. A set of multi-layer info panels coupled to the one or more processors may be configured to overlay graphics on top of the virtual assistant.

In some embodiments, the virtual assistant may be configured to be displayed as a human avatar or a cartoon character based on the user's choice. The virtual assistant may be configured to be displayed in full body or half body portrait mode. The artificial intelligence engine may be configured for real-time speech recognition, speech to text generation, real-time dialog generation, text to speech generation, voice-driven animation, and human avatar generation.

In some embodiments, the artificial intelligence engine may be configured to emulate different voices and use different languages. The human avatar may be configured to behave like a real human. The human avatar may be configured to look like a real human. The human avatar may be configured to have a unique personality out of a set of personalities. The human avatar may be configured to have a unique emotion setup of a set of emotion setups.

In some embodiments, the human avatar may be configured to have a unique intelligence out of a set of intelligences. The human avatar may be configured to share ideas and information and guide the user depending the user's needs. The human avatar may be configured to help the user to achieve the user's goals. The human avatar may be configured to be generated in a human-sized glass, or tablet, or a wall-mounted tablet that can move and be adjusted by the user.

In some embodiments, the human avatar may be configured to interact with the user via microphones, loud speaker, touch screen, front facing camera, wifi and bluetooth modules, adjustable holder &. Wheels that may be coupled to the one or more processors. The set of sensors may monitor the encounter area in a pre-determined manner. A set of touch screens coupled to the one or more processors may be configured to allow the user to interact with the virtual assistant by hand.

In some embodiments, the set of microphones may be connected to loudspeakers. The set of microphones may be enabled to be beamforming. The selection of the goal model may be based on the actions of the user performed after the user may enter into the encounter area and analysis of the artificial intelligence engine. The set of goal models may be generated from the artificial intelligence with a number of human experts with non-public expertise. Non-public expertise may comprise knowledge, human interaction, human characters, human conversation and human physiology. In some embodiments, the artificial intelligence engine may be a generative artificial intelligence engine.

Figure 3A:
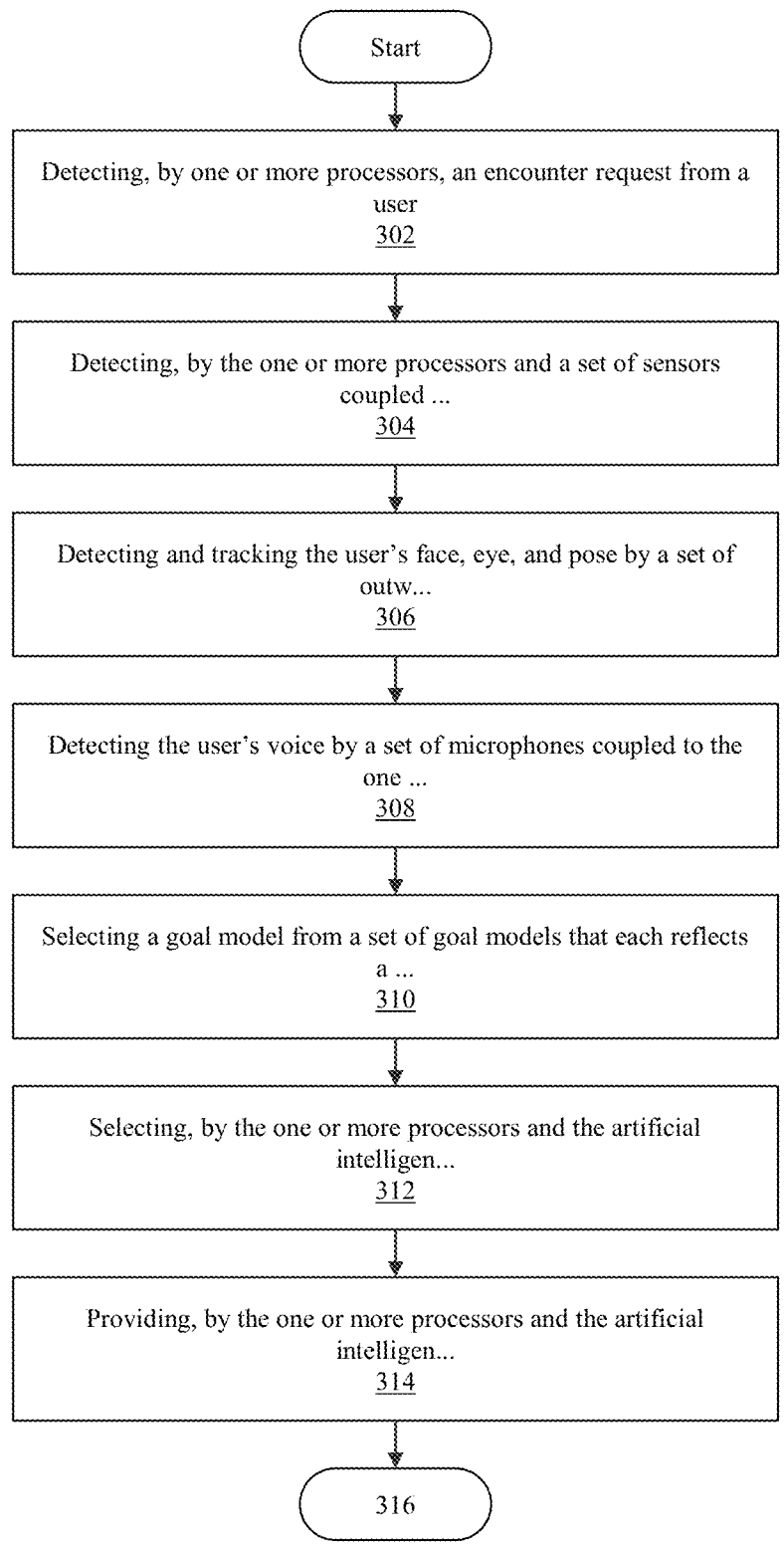
FIG. 3A is a flowchart illustrating a method for providing an encounter, according to some embodiments of the present disclosure.
Figure 3B:
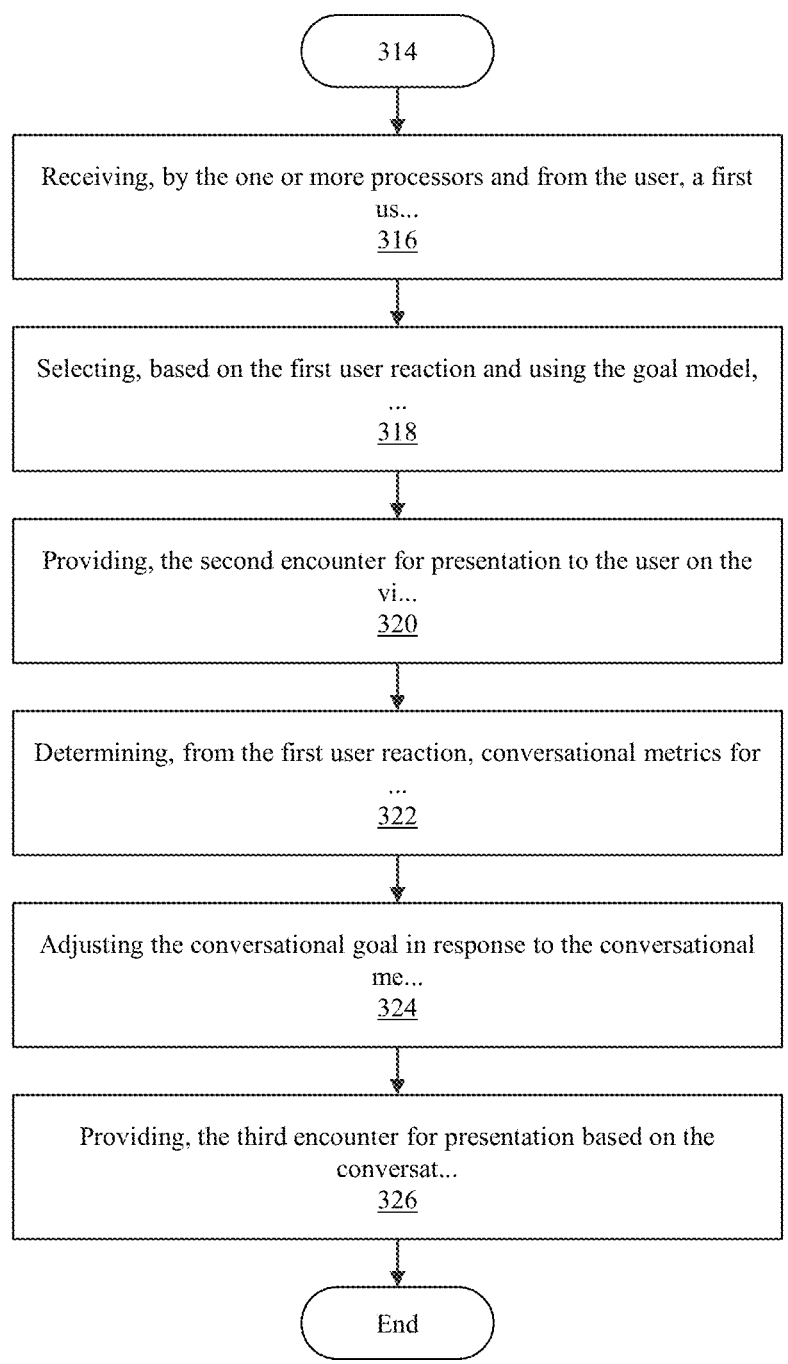
FIG. 3B is a flowchart extending from FIG. 3A and further illustrating the method for providing an encounter, according to some embodiments of the present disclosure.

FIGS. 3A to 3B are flowcharts that describe a method for providing an encounter, according to some embodiments of the present disclosure. In some embodiments, at 302, the method may include detecting, by one or more processors, an encounter request from a user. At 304, the method may include detecting, by the one or more processors and a set of sensors coupled to the one or more processors, an entering of the user into an encounter area. At 306, the method may include detecting and tracking the user's face, eye, and pose by a set of outward-facing cameras coupled to the one or more processors.

In some embodiments, at 308, the method may include detecting the user's voice by a set of microphones coupled to the one or more processors. At 310, the method may include selecting a goal model from a set of goal models that each reflects a different type of assistance to be provided to the user by the virtual assistant. At 312, the method may include selecting, by the one or more processors and the artificial intelligence engine, based on the goal model and responsive to the encounter request, a first encounter including a first representation and a first dialog output.

In some embodiments, at 314, the method may include providing, by the one or more processors and the artificial intelligence engine, based on the goal model and responsive to the encounter request, the first encounter for presentation to the user on the virtual assistant. At 316, the method may include receiving, by the one or more processors and from the user, a first user reaction, the first user reaction including a first user dialog input and a first user engagement input.

In some embodiments, at 318, the method may include selecting, based on the first user reaction and using the goal model, a second encounter including a second representation and a second dialog output. At 320, the method may include providing, the second encounter for presentation to the user on the virtual assistant. At 322, the method may include determining, from the first user reaction, conversational metrics for the enhanced encounter. At 324, the method may include adjusting the conversational goal in response to the conversational metrics. At 326, the method may include providing, the third encounter for presentation based on the conversational metrics to the user on the virtual assistant.

In some embodiments, an artificial intelligence engine may be coupled to the one or more processors. The artificial intelligence engine may be trained by human experts in the field. The virtual assistant may be configured to be displayed in LED/OLED displays, Android/iOS tablets, Laptops/PCs, or VR/AR goggles. A set of multi-layer info panels coupled to the one or more processors may be configured to overlay graphics on top of the virtual assistant.

In some embodiments, the virtual assistant may be configured to be displayed as a human avatar or a cartoon character based on the user's choice. The virtual assistant may be configured to be displayed in full body or half body portrait mode. The artificial intelligence engine may be configured for real-time speech recognition, speech to text generation, real-time dialog generation, text to speech generation, voice-driven animation, and human avatar generation.

In some embodiments, the artificial intelligence engine may be configured to emulate different voices and use different languages. The human avatar may be configured to behave like a real human. The set of sensors may monitor the encounter area in a pre-determined manner. A set of touch screens coupled to the one or more processors may be configured to allow the user to interact with the virtual assistant by hand. The set of microphones may be connected to loudspeakers.

In some embodiments, the set of microphones may be enabled to be beamforming. The selection of the goal model may be based on the actions of the user performed after the user may enter into the encounter area and analysis of the artificial intelligence engine. The set of goal models may be generated from the artificial intelligence with a number of human experts with non-public expertise. Non-public expertise may comprise knowledge, human interaction, human characters, human conversation and human physiology. In some embodiments, the artificial intelligence engine may be a generative artificial intelligence engine.

Figure 4:
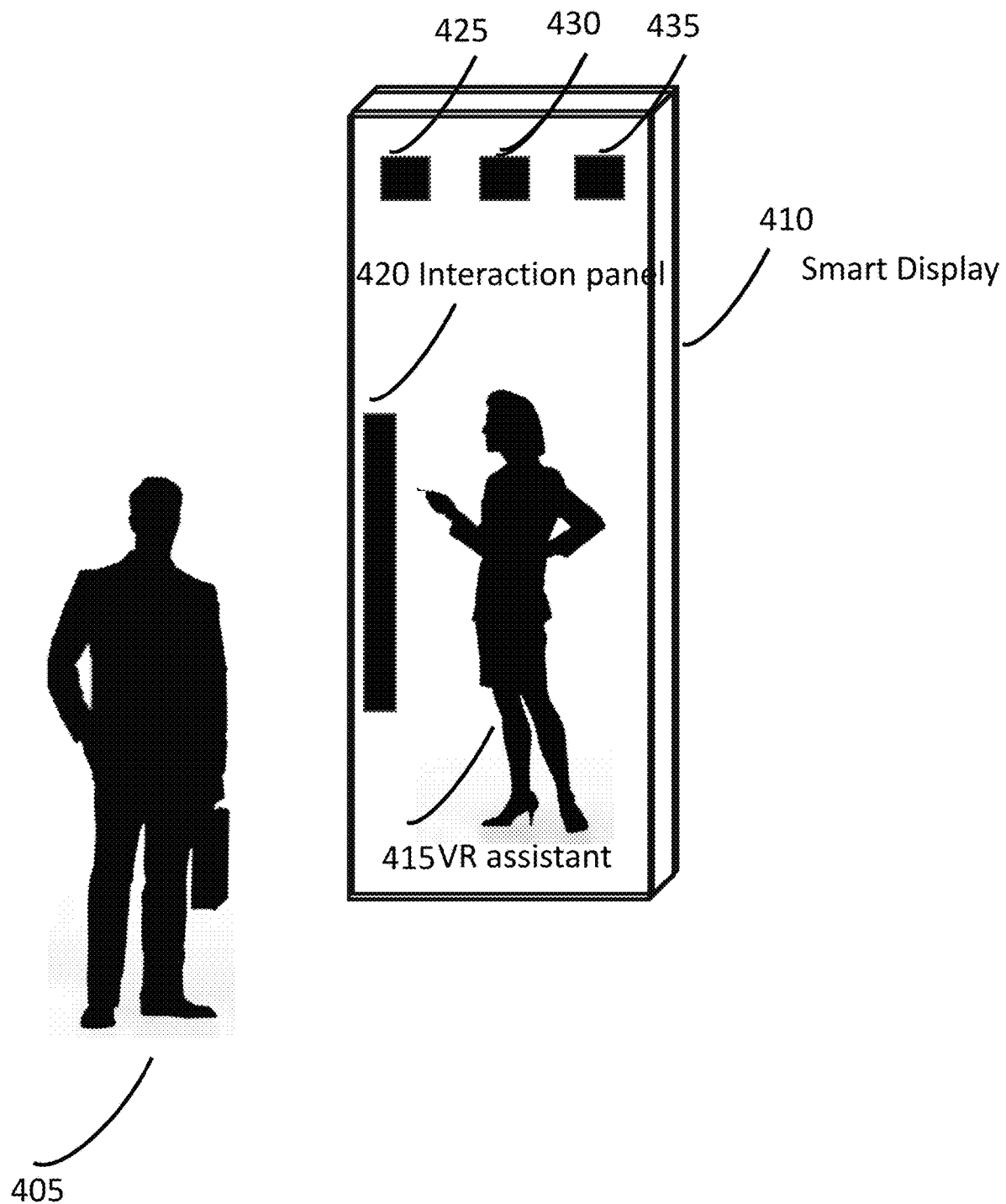
FIG. 4 is a diagram showing an example of providing an encounter of a virtual assistant.

FIG. 4 is a diagram showing an example of providing an encounter of a virtual assistant.

In some embodiments, a user 405 can approach a smart display 410. In some embodiments, the smart display 410 could be LED or OLED based. In some embodiments, interactive panels 420 is attached to the smart display 410. In some embodiments, a virtual assistant 415 is configured to act as a human avatar, showing on the smart display 410. In some embodiments, the virtual assistant 415 can be activated by sensor 425 that attached to the smart display 410 when the sensor 425 detects the user 405. In some embodiments, camera 430 and microphone 435 are attached to the smart display. In some embodiments, interactive panel 420, sensor 425, camera 430 and microphone 435 are coupled to a central processor. In some embodiments, interactive panel 420, sensor 425, camera 430 and microphone 435 are coupled to a server via wireless links. In some embodiments, the user 405 can interact with the virtual assistant 415 using methods descripted in FIG. 1A, FIG. 1B, FIG. 2A, FIG. 2B, FIG. 3A and FIG. 3B and with help of interactive panel 420, sensor 425, camera 430 and microphone 435.

Figure 5:
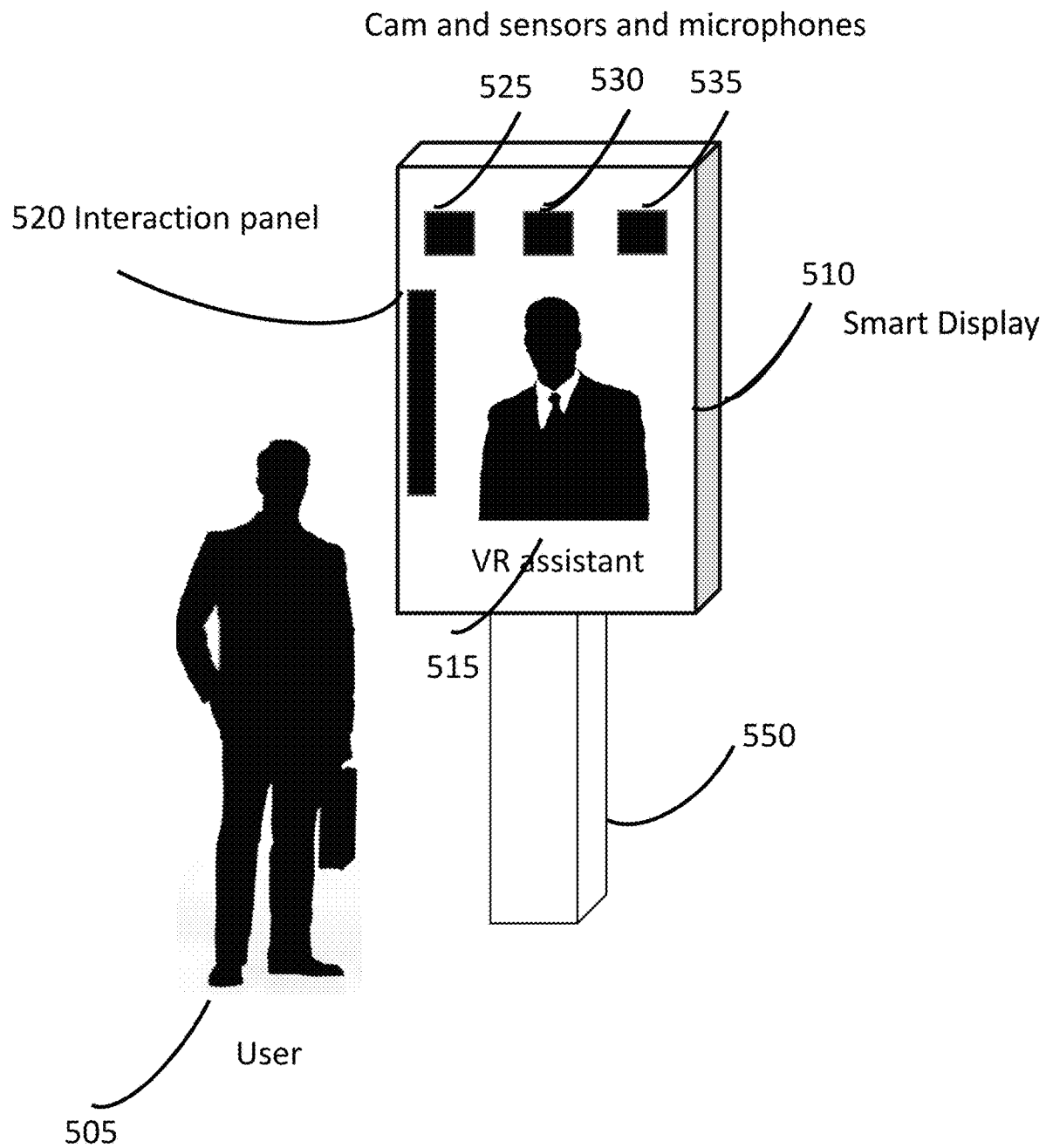
FIG. 5 is a diagram showing a second example of providing an encounter of a virtual assistant.

FIG. 5 is a second diagram showing an example of providing an encounter of a virtual assistant.

In some embodiments, a user 505 can approach a smart display 510. In some embodiments, the smart display 510 could be LED or OLED based. In some embodiments, a support column 550 supports the smart display 510. In some embodiments, interactive panels 520 is attached to the smart display 510. In some embodiments, a virtual assistant 515 is configured to act as a human avatar, showing on the smart display 510. In some embodiments, the virtual assistant 515 can be activated by sensor 525 that attached to the smart display 510 when the sensor 525 detects the user 505. In some embodiments, camera 530 and microphone 535 are attached to the smart display. In some embodiments, interactive panel 520, sensor 525, camera 530 and microphone 535 are coupled to a central processor. In some embodiments, interactive panel 520, sensor 525, camera 530 and microphone 535 are coupled to a server via wireless link. In some embodiments, the user 505 can interact with the virtual assistant 515 using methods descripted in FIG. 1A, FIG. 1B, FIG. 2A, FIG. 2B, FIG. 3A and FIG. 3B and with help of interactive panel 520, sensor 525, camera 530 and microphone 535.

Figure 6:
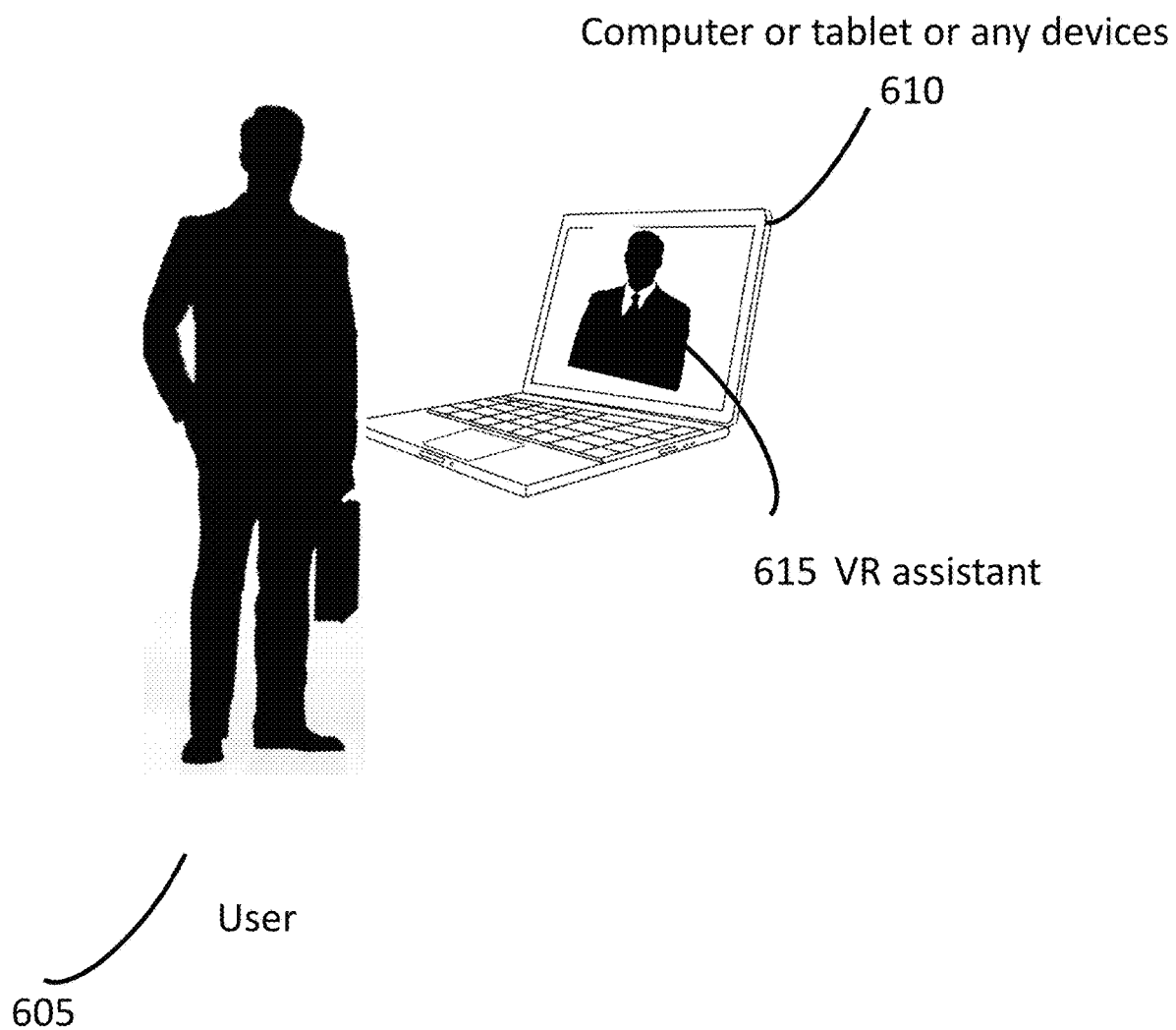
FIG. 6 is a diagram showing another example of providing an encounter of a virtual assistant.

FIG. 6 is a diagram showing another example of providing an encounter of a virtual assistant. In some embodiments, a user 605 can approach a computer 610. In some embodiments, the computer 610 could be laptop, desktop or tablet computer. In some embodiments, interactive panel, sensor, camera and microphone are attached to the computer 610. In some embodiments, interactive panel, sensor, camera and microphone are coupled to a central processor. In some embodiments, interactive panel, sensor, camera and microphone are coupled to a server via wireless links. In some embodiments, the user 605 can interact with the virtual assistant 615 using methods descripted in FIG. 1A, FIG. 1B, FIG. 2A, FIG. 2B, FIG. 3A and FIG. 3B and with help of interactive panel, sensor, camera, microphone or keyboard of the computer 610.

In some embodiments, the virtual assistant is configured to change adaptively in real time according to the statistics of the demographic information for potential consumers, wherein the information includes the age, gender, and occupation of the pedestrians, wherein the information is obtained from the passive visual sensing via a set of cameras with face/body patterns, wherein the information includes basic psychographic information, wherein the basic psychographic information includes attitude, feelings, interests, activities, and social structures, wherein the basic psychographic information is inferred and summarized through dynamic emotional state estimation and contextual analysis from computer vision based image/video understanding.

In some embodiments, the virtual assistant be could be run by software either in local devices or on the cloud.

In some embodiments, the virtual assistant could be cloned from a real person, wherein the virtual assistant is configured to mimic the person's appearance, expressions, habits, voice, gestures and other appearances.

The invention claimed is:

1. A method for providing an encounter via a virtual assistant with artificial intelligence, the method comprising:

detecting, by one or more processors, an encounter request from a user, wherein an artificial intelligence engine is coupled to the one or more processors, wherein the artificial intelligence engine is trained by human experts in the field, wherein the virtual assistant is configured to be displayed in LED/OLED displays, Android/iOS tablets, Laptops/PCs, or VR/AR goggles, wherein a set of multi-layer info panels coupled to the one or more processors are configured to overlay graphics on top of the virtual assistant, wherein the virtual assistant is configured to be displayed as a human avatar or a cartoon character based on the user's choice, wherein the virtual assistant is configured to be displayed in full body or half body portrait mode, wherein the artificial intelligence engine is configured for real-time speech recognition, speech to text generation, real-time dialog generation, text to speech generation, voice-driven animation, and human avatar generation, wherein the artificial intelligence engine is configured to emulate different voices and use different languages, wherein the human avatar is configured to behave like a real human, wherein the human avatar is configured to look like a real human, wherein the human avatar is configured to have a unique personality out of a set of personalities, wherein the human avatar is configured to have a unique emotion setup of a set of emotion setups, wherein the human avatar is configured to have a unique intelligence out of a set of intelligences, wherein the human avatar is configured to share ideas and information and guide the user depending the user's needs, wherein the human avatar is configured to help the user to achieve the user's goals, wherein the human avatar is configured to be generated in a human-sized glass, or tablet, or a wall-mounted tablet that can move and be adjusted by the user, wherein the human avatar is configured to interact with the user via microphones, loud speaker, touch screen, front facing camera, wifi and bluetooth modules, adjustable holder & wheels that are coupled to the one or more processors, detecting, by the one or more processors and a set of sensors coupled to the one or more processors, an entering of the user into an encounter area, wherein the set of sensors monitor the encounter area in a predetermined manner;

detecting and tracking the user's face, eye, and pose by a set of outward-facing cameras coupled to the one or more processors, wherein a set of touch screens coupled to the one or more processors is configured to allow the user to interact with the wind watoal assistant by hand;

detecting the user's voice by a set of microphones coupled to the one or more processors, wherein the set of microphones are connected to loudspeakers, wherein the set of microphones are enabled to be beamforming;

selecting a goal model from a set of goal models that each reflects a different type of assistance to be provided to the user by the virtual assistant, wherein the selection of the goal model is based on the actions of the user performed after the user enters into the encounter area and analysis of the artificial intelligence engine, wherein the set of goal models are generated from the artificial intelligence with a number of human experts with non-public expertise, wherein non-public expertise comprises knowledge, human interaction, human characters, human conversation and human physiology;

selecting, by the one or more processors and the artificial intelligence engine, based on the goal model and responsive to the encounter request, a first encounter including a first representation and a first dialog output; and providing, by the one or more processors and the artificial intelligence engine, based on the goal model and responsive to the encounter request, the first encounter for presentation to the user on the virtual assistant;

receiving, by the one or more processors and from the user, a first user reaction, the first user reaction including a first user dialog input and a first user engagement input; and selecting, based on the first user reaction and using the goal model, a second encounter including a second representation and a second dialog output;

providing, the second encounter for presentation to the user on the virtual assistant;

determining, from the first user reaction, conversational metrics for the enhanced encounter; and adjusting the conversational goal in response to the conversational metrics.

2. The method for providing an encounter via a virtual assistant with artificial intelligence in claim 1, wherein the artificial intelligence engine is a generative artificial intelligence engine.

3. A method for providing an encounter via a virtual assistant with artificial intelligence, the method comprising:

detecting, by one or more processors, an encounter request from a user, wherein an artificial intelligence engine is coupled to the one or more processors, wherein the artificial intelligence engine is trained by human experts in the field, wherein the virtual assistant is configured to be displayed in LED/OLED displays, Android/iOS tablets, Laptops/PCs, or VR/AR goggles, wherein a set of multi-layer info panels coupled to the one or more processors are configured to overlay graphics on top of the virtual assistant, wherein the virtual assistant is configured to be displayed as a human avatar or a cartoon character based on the user's choice, wherein the virtual assistant is configured to be displayed in full body or half body portrait mode, wherein the artificial intelligence engine is configured for real-time speech recognition, speech to text generation, real-time dialog generation, text to speech generation, voice-driven animation, and human avatar generation, wherein the artificial intelligence engine is configured to emulate different voices and use different languages, wherein the human avatar is configured to behave like a real human, wherein the human avatar is configured to look like a real human, wherein the human avatar is configured to have a unique personality out of a set of personalities, wherein the human avatar is configured to have a unique emotion setup of a set of emotion setups, wherein the human avatar is configured to have a unique intelligence out of a set of intelligences, wherein the human avatar is configured to share ideas and information and guide the user depending the user's needs, wherein the human avatar is configured to help the user to achieve the user's goals, wherein the human avatar is configured to be generated in a human-sized glass, or tablet, or a wall-mounted tablet that can move and be adjusted by the user, wherein the human avatar is configured to interact with the user via microphones, loud speaker, touch screen, front facing camera, wifi and bluetooth modules, adjustable holder & wheels that are coupled to the one or more processors;

detecting, by the one or more processors and a set of sensors coupled to the one or more processors, an entering of the user into an encounter area, wherein the set of sensors monitor the encounter area in a predetermined manner;

detecting and tracking the user's face, eye, and pose by a set of outward-facing cameras coupled to the one or more processors, wherein a set of touch screens coupled to the one or more processors is configured to allow the user to interact with the virtual assistant by hand;

detecting the user's voice by a set of microphones coupled to the one or more processors, wherein the set of microphones are connected to loudspeakers, wherein the set of microphones are enabled to be beamforming;

selecting a goal model from a set of goal models that each reflects a different type of assistance to be provided to the user by the virtual assistant, wherein the selection of the goal model is based on the actions of the user performed after the user enters into the encounter area and analysis of the artificial intelligence engine, wherein the set of goal models are generated from the artificial intelligence with a number of human experts with non-public expertise, wherein non-public expertise comprises knowledge, human interaction, human characters, human conversation and human physiology;

selecting, by the one or more processors and the artificial intelligence engine, based on the goal model and responsive to the encounter request, a first encounter including a first representation and a first dialog output; and providing, by the one or more processors and the artificial intelligence engine, based on the goal model and responsive to the encounter request, the first encounter for presentation to the user on the virtual assistant;

receiving, by the one or more processors and from the user, a first user reaction, the first user reaction including a first user dialog input and a first user engagement input; and selecting, based on the first user reaction and using the goal model, a second encounter including a second representation and a second dialog output;

providing, the second encounter for presentation to the user on the virtual assistant;

determining, from the first user reaction, conversational metrics for the enhanced encounter; adjusting the conversational goal in response to the conversational metrics; and providing, the third encounter for presentation based on the conversational metrics to the user on the virtual assistant.

4. The method for providing an encounter via a virtual assistant with artificial intelligence in claim 3, wherein the artificial intelligence engine is a generative artificial intelligence engine.

5. A method for providing an encounter via a virtual assistant with artificial intelligence, the method comprising:

detecting, by one or more processors, an encounter request from a user, wherein an artificial intelligence engine is coupled to the one or more processors, wherein the artificial intelligence engine is trained by human experts in the field, wherein the virtual assistant is configured to be displayed in LED/OLED displays, Android/iOS tablets, Laptops/PCs, or VR/AR goggles, wherein a set of multi-layer info panels coupled to the one or more processors are configured to overlay graphics on top of the virtual assistant, wherein the www virtua assistant is configured to be displayed as a human avatar or a cartoon character based on the user's choice, wherein the virtual assistant is configured to be displayed in full body or half body portrait mode, wherein the artificial intelligence engine is configured for real-time speech recognition, speech to text generation, real-time dialog generation, text to speech generation, voice-driven animation, and human avatar generation, wherein the artificial intelligence engine is configured to emulate different voices and use different languages, wherein the human avatar is configured to behave like a real human;

detecting, by the one or more processors and a set of sensors coupled to the one or more processors, an entering of the user into an encounter area, wherein the set of sensors monitor the encounter area in a predetermined manner;

detecting and tracking the user's face, eye, and pose by a set of outward-facing cameras coupled to the one or more processors, wherein a set of touch screens coupled to the one or more processors is configured to allow the user to interact with the virtual assistant by hand;

detecting the user's voice by a set of microphones coupled to the one or more processors, wherein the set of microphones are connected to loudspeakers, wherein the set of microphones are enabled to be beamforming;

selecting a goal model from a set of goal models that each reflects a different type of assistance to be provided to the user by the virtual assistant, wherein the selection of the goal model is based on the actions of the user performed after the user enters into the encounter area and analysis of the artificial intelligence engine, wherein the set of goal models are generated from the artificial intelligence with a number of human experts with non-public expertise, wherein non-public expertise comprises knowledge, human interaction, human characters, human conversation and human physiology;

selecting, by the one or more processors and the artificial intelligence engine, based on the goal model and responsive to the encounter request, a first encounter including a first representation and a first dialog output; and providing, by the one or more processors and the artificial intelligence engine, based on the goal model and responsive to the encounter request, the first encounter for presentation to the user on the virtual assistant;

receiving, by the one or more processors and from the user, a first user reaction, the first user reaction including a first user dialog input and a first user engagement input; and selecting, based on the first user reaction and using the goal model, a second encounter including a second representation and a second dialog output;

providing, the second encounter for presentation to the user on the virtual assistant;

determining, from the first user reaction, conversational metrics for the enhanced encounter;

adjusting the conversational goal in response to the conversational metrics; and providing, the third encounter for presentation based on the conversational metrics to the user on the virtual assistant.

6. The method for providing an encounter via a virtual assistant with artificial intelligence in claim 5, wherein the artificial intelligence engine is a generative artificial intelligence engine.

7. The method for providing an encounter via a virtual assistant with artificial intelligence in claim 5, wherein the virtual assistant is configured to change adaptively in real time according to the statistics of the demographic information for potential consumers, wherein the information includes the age, gender, and occupation of the pedestrians, wherein the information is obtained from the passive visual sensing via a set of cameras with face/body patterns, wherein the information includes basic psychographic information, wherein the basic psychographic information includes attitude, feelings, interests, activities, and social structures, wherein the basic psychographic information is inferred and summarized through dynamic emotional state estimation and contextual analysis from computer vision based image/video understanding.

8. The method for providing an encounter via a virtual assistant with artificial intelligence in claim 5, wherein the virtual assistant could be run by software either in local devices or on the cloud.

9. The method for providing an encounter via a virtual assistant with artificial intelligence in claim 5, wherein the virtual assistant could be cloned from a real person, wherein the virtual assistant is configured to mimic the person's appearance, expressions, habits, voice, gestures and other appearances.

* * * * *